United States Patent [19]

Lampert

[11] 4,412,647
[45] Nov. 1, 1983

[54] MEASURING USE OF HEAT OR THE LIKE AT INDIVIDUAL ZONES SUPPLIED FROM ONE SOURCE

[75] Inventor: Heinz Lampert, Buchs, Switzerland

[73] Assignee: Willy Lanker, Zumikon, Switzerland; a part interest

[21] Appl. No.: 404,383

[22] Filed: Aug. 2, 1982

Related U.S. Application Data

[63] Continuation-in-part of Ser. No. 143,265, Apr. 24, 1980, abandoned.

[30] Foreign Application Priority Data

Apr. 25, 1979 [CH] Switzerland .................. 3875/79
Apr. 10, 1980 [CH] Switzerland .................. 2754/80

[51] Int. Cl.³ .................................. G01K 17/00
[52] U.S. Cl. .................. 236/36; 165/11 R; 236/94; 374/39
[58] Field of Search ............... 374/39-41; 165/11 R; 236/94, 36

[56] References Cited

U.S. PATENT DOCUMENTS

| | | | |
|---|---|---|---|
| 3,580,070 | 5/1971 | Cumpston, Jr. | 374/39 |
| 3,812,713 | 5/1974 | Karlsson | 364/510 X |
| 3,995,686 | 12/1976 | Laube | 236/94 |
| 4,085,613 | 4/1978 | Richard | 73/193 R |
| 4,157,034 | 6/1979 | Büchele | 73/193 R |
| 4,190,084 | 2/1980 | Harrison | 137/883 |
| 4,221,260 | 9/1980 | Otala et al. | 374/39 X |
| 4,245,501 | 1/1981 | Feller | 374/41 |
| 4,250,747 | 2/1981 | Diprose et al. | 374/41 |
| 4,298,165 | 11/1981 | McKinley | 236/8 R |

Primary Examiner—William E. Wayner
Attorney, Agent, or Firm—James E. Nilles

[57] ABSTRACT

The apparatus for controlling a discontinuously flowing material flow and for measuring a value proportional to this material flow and a further physical magnitude serves particularly for measurement of heat quantities, preferably in central heating apparatus. For this it utilizes at least a self-regulating flow valve (16) for allowing flow-through of a constant material stream (2) and an open/closed material through-flow valve (6) connected in series with the flow valve (16) and controlled by a third physical magnitude ($T_o$). A servo control device is associated with the material through-flow valve (6). In this the material flowing through the through-flow valve (6) serves as a servo control medium. A thermostat (9), a time register, a pH gage, a concentration gage or a level gage serves for control of the servo device. By means of an apparatus of this type there is solved the problem of measuring in the simplest possible manner the product of two magnitudes that are connected with one another, for example, material quantity and temperature, as this is desirable, for example, for measurement of heat quantities in portions of central heating systems or for simultaneously metering out predetermined material quantities at predetermined times.

7 Claims, 10 Drawing Figures

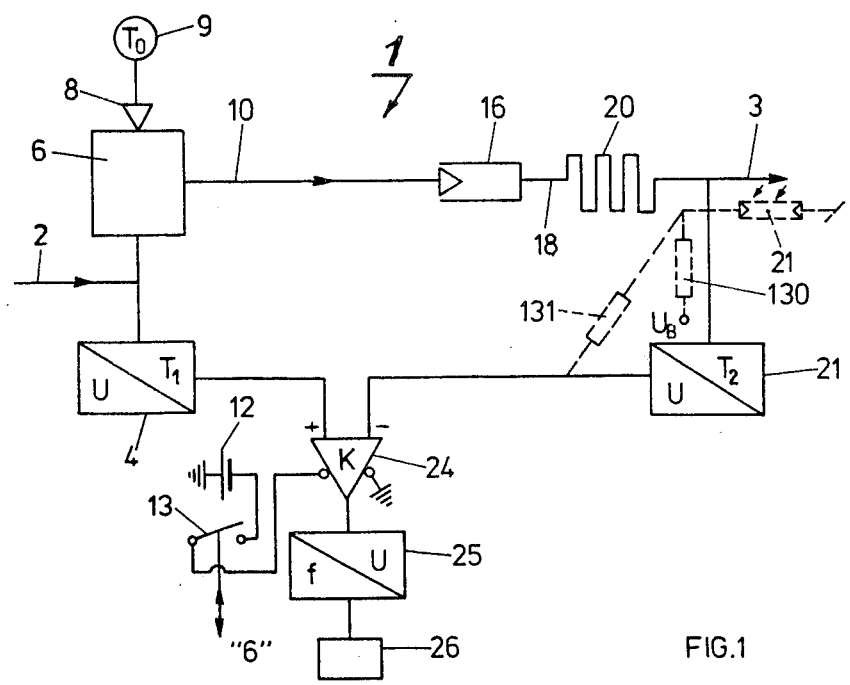
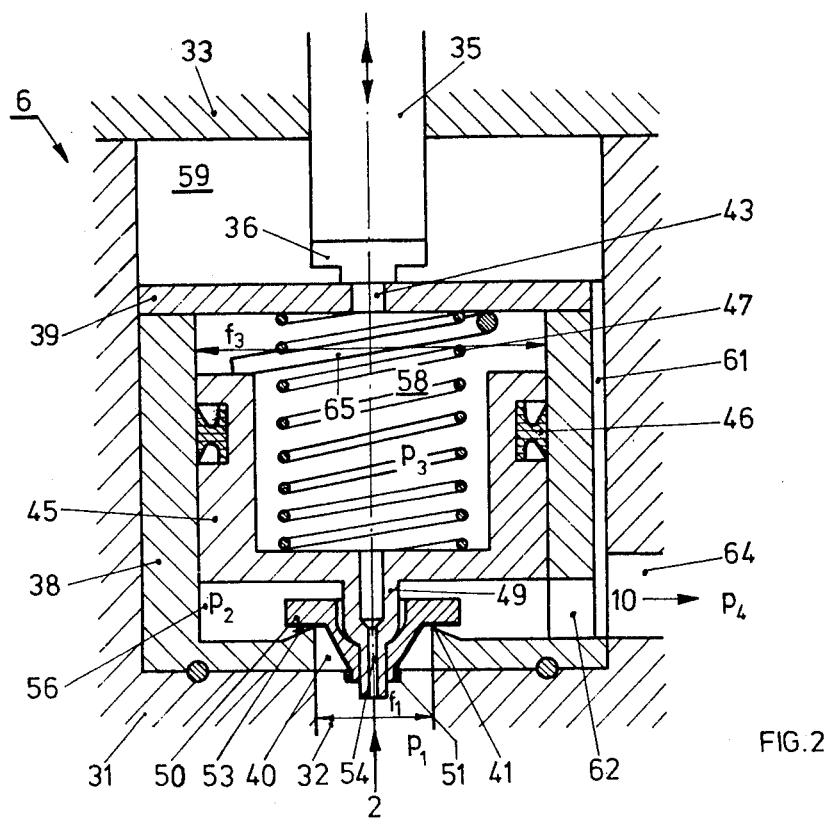
FIG.1
FIG.2

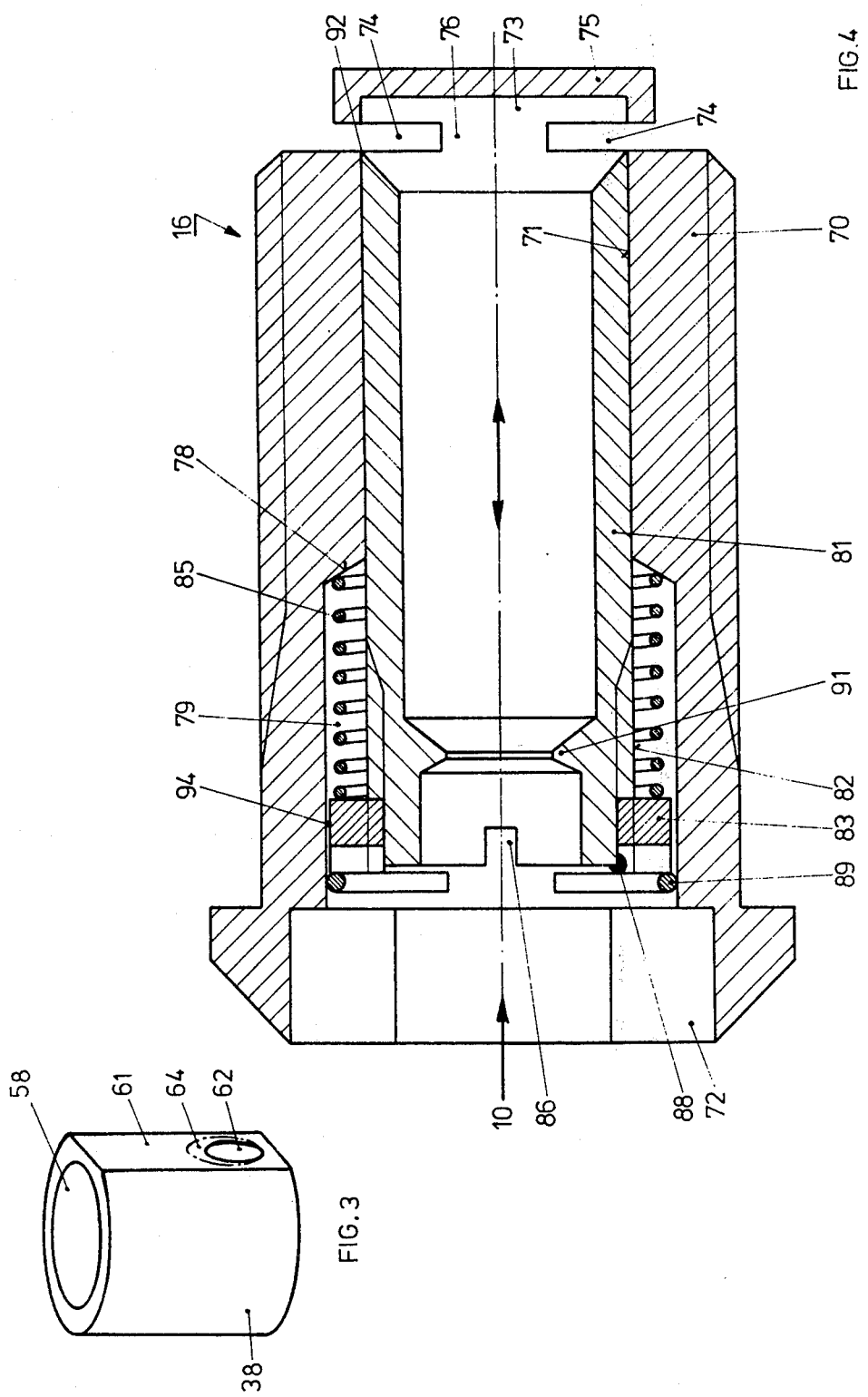

MEASURING USE OF HEAT OR THE LIKE AT INDIVIDUAL ZONES SUPPLIED FROM ONE SOURCE

This application is a continuation-in-part of co-pending application Ser. No. 143,265, filed Apr. 24, 1980, abandoned after the filing hereof.

The present invention relates to an apparatus for controlling a discontinuously flowing material flow and for measuring a value proportional to this material flow and to a further physical magnitude, particularly for measuring heat quantities abstracted from hot water or steam at one of several zones of use supplied from a central heating apparatus and at each of which demand for heat is individually controlled.

In the state of the art, there are procedures for measuring residential emission of heat in central heating systems, in which procedures the water quantity circulating in the system is held constant and this water quantity and the temperature difference of the water flowing into the domestic portion and the water flowing out of it are measured and are multiplied by time and the constant water flow volume that flows through, to measure the heat quantity that is given off in this time.

For this purpose this apparatus uses a constant delivery circulating pump, a so-called positive delivery pump, such as is represented by rotating piston pumps or vane pumps. This approach nevertheless requires specific expensive apparatus parts, as for example a positive delivery pump of such type. In addition, there is no assurance that equal water flow volumes will flow through the various residences, as a result of which errors can arise at the heat meter, which calculates on the basis of a constant quantity (French Patent No. 935,963).

There is also known an apparatus for measuring the stream velocity of a medium flowing along a wall, or of a heat quantity transported by the same, wherein a part of a heat conducting body that is in the medium, isolated from the wall heat, is heated or cooled by the medium. Another part of this body, from the opposite side of the wall, is brought into heat conducting connection with a heat conducting means of another temperature than the aforementioned medium. A measurement device serves for the measurement of the temperature difference between two different parts of the heat conducting body. A device of this type is complicated in construction and therefore expensive, and it is not suitable for building into a central heating system in apartment houses for simple measurement of the heat quantity used in each apartment (Swiss Patent No. 268,203).

The present invention has the objective of providing an apparatus that allows the product of two magnitudes that are related to one another, for example material quantity and temperature, to be measured in the simplest possible manner, as is desired for example for the measuring of heat quantities in parts of central heating systems or for uniform metering out of predetermined material quantities at predetermined times.

This objective is achieved by the installation according to the invention, which is characterized by at least one self-regulating flow rate control valve to allow the flow-through of a constant material flow and an on-off material through-flow valve connected in series with the flow valve and controlled by a third physical magnitude.

The subject matter of the invention will be hereinafter explained in connection with the accompanying drawings, wherein:

FIG. 1 is a schematic of a heat exchange apparatus with a heat through-flow recorder;

FIG. 2 is a longitudinal section of an on-off through-flow valve in its closed condition;

FIG. 3 is a perspective illustration of the inner housing of the valve according to FIG. 2;

FIG. 4 is a longitudinal section through a flow rate control valve in its condition of rest;

Figure 5:
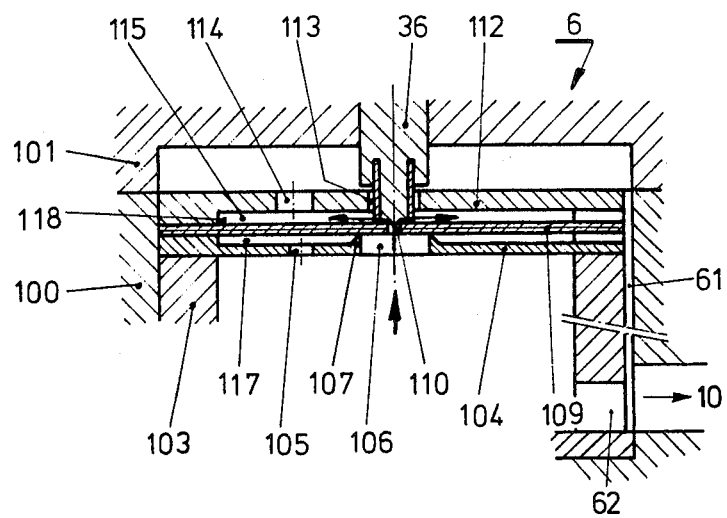
FIG. 5 is a section of a variant of a valve according to FIG. 2.

A heat exchange apparatus 1, which can be for example the part of a central heating apparatus in one room, comprises a warm water inlet 2 and a warm water outlet 3. A temperature sensor 4, for example a resistance thermometer PTC or NTC, a Peltier-element or a bimetal element, senses the temperature at the warm water inlet 2. The warm water supply duct leads to a thermostatically controlled on-off valve 6, the construction of which can be seen in FIG. 2. A control valve 8, controlled by a room thermostat 9, in turn controls the condition of the on-off valve 6, which is either open or closed, as basically determined by the room thermostat 9. The latter, furthermore, reacts to the temperature of the room in which there is located the heat exchanger 20, which is, for example, a heat radiator. Naturally, it is also possible to allow the on-off valve 6 to be controlled by a thermostat in another room or by an outside thermostat or another analogous control. The inflow of warm water to the on-off valve 6 takes place at 2, while, with the valve 6 open, the water flows on through a duct 10 into a so-called flow valve 16, a valve which regulates the quantity flowing therethrough to a constant value. The flow rate control valve 16 has a passage cross-section that decreases with an increasing pressure difference in the medium and increases with diminishing pressure difference, in such a manner that the regulated cross-section, multiplied by the velocity corresponding to the pressure difference, comprises a constant existing value corresponding to the demand value.

Finally, the warm water arrives by way of a duct 18 at a heat exchanger 20 and from there flows to the warm water outlet 3. After the heat exchanger 20 there is built in a further temperature sensor 21, preferably in the form of a resistance thermometer PTC or NTC or a Peltier element or bimetal element. Since the volume that flows through the heat exchanger 20 is either zero or larger and constant, there is needed only the integration of the respective instantaneous temperature difference values between the temperatures at the inlet of the apparatus and at the outlet, that is, the temperatures $T_1$ and $T_2$ of the two resistance thermometer sensors 4 and 21.

Since the value of the temperature in the resistance thermometers, which are formed as temperature/voltage transformers, is measurable through the electrical voltage, the two voltages of the thermometers 4 and 21 are conducted to an operational amplifier 24 in which an output signal is formed that corresponds to the temperature difference $(T_1-T_2)$, amplified by the factor K.

The resulting output voltage is conducted to a voltage/frequency transformer 25. The operational amplifier 24 and the voltage-frequency transformer 25 together comprise counting means which is energized from the battery 12 when the switch 13 is closed and the output of which is fed to a meter 26 whereby the heat quantity given off at the room in a selected time span under consideration is directly readable in digital display arrays.

In FIG. 2 there can be seen in section the thermostatically controlled on-off valve 6 in all of its individual parts that are essential to the invention, in its basic construction. The warm water inlet 2 leads to a delivery bore 32 in the bottom of an outer valve housing 31 for the valve 6. A cover 33 closes off the outer valve housing 31. The warm water inflow 2 is conducted into the delivery bore 32. Through the housing cover 33 extends an actuating rod 35 which is operated, for example, from the thermostatic sensor of the thermostat 9 (FIG. 1). On the free front of the actuating rod 35 there is a seal 36. A cylinder-like housing insert 38 is driven into the valve housing 31 and is closed over by means of a cover 39. The bottom portion of the housing insert 38 is provided with a bore 40 and with a valve seat 41 that surrounds it. The cover 39 is provided with a control bore 43.

In the housing insert 38 there is a pot-shaped piston 45 with a ring seal 46. In the cavity of the piston 45 there is provided a coil spring 47, one end of which lies against the bottom of the piston 45 and the other end of which lies against the cover 38. Beneath the piston 45 there is a piston projection 49 that is a carrier of a valve body 50 which is movably connected on it and which, together with its rubber coating, is secured to the projection 49 by means of a restraining spring ring 51. An induced flow bore 54 leads through the piston projection 49. When the valve is closed, the valve body 50 serves to separate the outlet chamber 56 from the delivery bore 32. The induced flow bore 54 leads to a piston/cylinder induction chamber 58 which, for its part, is flow connected through the cover control bore 43 with a housing induction flow chamber 59. A longitudinal bevel on the housing insert 38 allows an induced flow channel 61 to exist in the assembled condition of the valve 6, and into the lower portion of it a radial outlet opening 62 opens from the outlet chamber 56. Opposite this outlet opening 62 and arranged shiftably relative to it there is a drain 64 in the housing, the diameter of which is larger than the outlet opening 62, whereby in a section taken on the plane through the axes of the two openings the connecting lines of the two highest surface lines of the two openings 62 and 64 according to FIG. 2 preferably form an angle relative to the opening axes of 15° to 20°, an opening angle which distinguishes an effective diffusor or injector.

The upper side of the piston 45 operates a lever 65, which is schematically illustrated in FIG. 2, which, for its part, opens and closes a switch 13 in a current circuit of the battery 12. As is apparent from FIG. 1, the switch 13 controls the current supply from the battery 12 to the counting means comprising the operational amplifier 24 and the voltage frequency transformer 25, so that recording of heat utilization at the meter 26 takes place only when heat is actually being utilized, that is, when the on-off valve 6 is open, and the switch 13 effectively cuts off the meter or recording means 26 at times when no demand output is being produced by the thermostat 9. Of course, the last reading stored in the meter 26 upon opening of the switch 13 is retained therein while the switch remains open, unless the meter is resettable and is reset.

The inlet working surface on the valve body 50 is designated by $f_1$, the pressure produced in the duct 2 by $p_1$. The pressure in the outlet chamber 56 is $p_2$, while the surface belonging to its greatest diameter is designated by $f_3$. The pressure in the duct 10 is $p_4$.

Connected after the valve 6 through the duct 10 is the flow rate control valve 16, which is represented in longitudinal section in FIG. 4 and is explained in the following.

This flow rate control valve 16, which is distinguished by a self-regulated constant through-flow of water, comprises a housing 70 resembling a flanged pipe with a central bore 71. In the flange there is an interior hexagonal surface 72, in order to be able to mount the valve 16. At the other end of the housing 70 there is an end pin 73 with two milled windows 74 in its periphery. The bottom 75 of the end pin 73 is connected with the surface of the housing 70 by two circumferential straps 76. The inner bore 71 transitions across a shoulder 78 into a cylindrical clearance 79. In the inner bore 71 a metering piston 81 is slidably arranged. The upper portion of this carries an external thread 82 with an adjusting nut 83. In the clearance 79 there is a helical spring 85 which has one of its ends lying against the annular shoulder 78 and its other end against the adjusting nut 83. Screw slots 86 in the periphery of the metering piston 81 allow the position of the adjusting nut 83 to be correspondingly adjusted by means of the external thread 82 and thereby the helical spring 85 to be tared. After taring, a varnish seal 88 serves to prevent an unintentional adjustment of the adjusting nut 83 upon the metering piston 81. A spring ring 89 that extends around about $\frac{2}{3}$ of the circumference serves to define the axial running limit of the metering piston 81. In the metering piston 81 a central bore is provided which is formed in its front portion as a calibration aperture 91. The piston end has a control edge 92. Between the surface of the cylinder-shaped adjusting nut 83 and the housing 70, in the region of the clearance 79, there is provided a pressure equalizing throttling channel 94 which serves for damping the movement of the metering piston 81 in the housing 70 of the flow rate control valve 16.

The manner of functioning of the thermostatically controlled on-off valve 6 and its connected flow rate control valve 16 in the embodiments represented in FIGS. 2–4 is as follows:

The on-off valve 6 that is controlled by the room thermostats 9 is in its closed position, seen in FIG. 2.

The opening force $f_1 \cdot p_1$ then acts upon the valve body 50 in the opening direction, while the force of the spring 47 as well as the force $p_3 \cdot f_3$ yield closing forces, whereof the pressure $p_3$ corresponds to the pressure $p_1$. Since the valve 6 is closed, the outlet chamber 56, the duct 10 and the flow rate control valve 16 are without overpressure.

The flow rate control valve 16 is in its fully open condition, in which the adjusting nut 83 stands next to the spring ring 89, since the force of the helical spring 85 moves it into this position along with the metering piston 81. The control edge 92 lies wholly free of the two windows 74.

If now, in consequence of decline of the room temperature, the room thermostat 9 moves the actuating rod 35 upwardly (at a maximum of 0.02 mm/minute) then its seal 36 is freed from the cover control bore 43. According to the cross-section relationship of the cover control bore 43 and the induced flow bore 54, the pressure $p_3$ in the piston/cylinder-induction chamber 58 continually sinks. The inflowing quantity that continues to flow in through the induced flow bore 54 flows through the cover control bore 43, into the induction flow housing chamber 59, through the induced flow channel 61 into the duct 10, and through the flow rate control valve 16 to the user. Nevertheless, the position of the flow rate control valve 16 does not change, notwithstanding the small water quantity (leakage water) flowing through. The pressure $p_3$ decreases until the spring biased piston 45 is counterbalanced. Then, neglecting the weight, $$p_1 \cdot f_1 + p_3 \cdot f_3 + K_f = 0.$$

If $p_3$ declines further, the valve body 50 opens. Therefore $p_2$ rises.

The opening force acting upon the valve body 50, $f_1 \cdot p_1 + f_3(p_2 - p_3)$, which then predominates, moves the piston 45 upwardly against the closing force of the spring 47 and thereby increasingly opens the inlet to and through the outlet chamber 56. The valve opens more and more. The pressure $p_2$ in the outlet chamber 56 grows quickly and the metering piston 81 goes to its upper end position in which the valve 16 is completely opened. The water flow pours out through the outlet opening 62 and the housing drain opening 64, and thereby, conditioned upon the diffuser effect of this stream, shooting out with several meters velocity, effects a suction effect upon the water present in the induced flow channel 61 which prevents any dam-up or build-up of a water force acting in the closing direction. This suction effect reduces $p_3$ and therefore has a valve opening influence.

The water which then shoots into the flow rate control valve 16 undergoes a damming up at the aperture 91, for which reason it exerts upon the metering piston 81 a force that moves it out of its position of rest. As a result, the control edge 22 is pushed over the two windows 74 to partially cover them. An opposing pressure then builds up in the chamber behind the aperture 91, which tries to push the metering piston 81 back into its open position. In consequence, a part of the window 74 is again uncovered. The metering piston 81 therefore moves itself until the forces engaging it are in equipoise, that is, the closing force of the helical spring 85 and the force of the inflowing water upon the aperture 91, on the one hand, and the closing force of the pressure that builds up behind the aperture 91, are held in equilibrium.

When, therefore, the on-off valve 6, as explained, opens abruptly or in the same way closes abruptly, then the metering piston 81 very quickly goes to its described equipoise position or to its end position of rest. In order to avoid an oscillation of the metering piston 81 with hunting in its equipoise position, and at the same time assure pressure equalization in the clearance 79, the pressure equalizing throttling channel 94 is so dimensioned that the metering piston cannot fall into oscillation.

Through the adjustment of the helical spring 47 in the on-off valve 6, which does not in itself in any way influence the flow, and the helical spring 85 in the flow rate control valve 16, both of these can be matched to the throughflow relationships of the apparatus in which they find employment.

Thus it results that the on-off valve 6 has insignificant opening and closing times and therefore works with a nearly square-wave impulse operation, which naturally acts favorably upon the accuracy of the heat recording.

Thereby a magnitude to be controlled—in the present case room temperature—is controlled as a function of the on-off valve 6 in its open or its closed position. If it is in the open position, the water flows from the duct 10 into the flow rate control valve 16, which opens its through-flow cross-section more or less, in correspondence with the pressure of the water, in such a manner that the through-flow quantity remains constant. The water escapes through the warm water duct 18 and arrives at the heat exchanger 20, where it gives off its heat to the room and heats it in accordance with the temperature gradient. The cooler water leaves the heat exchanger 20 through the warm water outlet 3.

To specify how large the heat quantity is that is given off from the heat exchanger 20 in the course of time, the voltage difference between the two resistance thermometers is formed by the sensors 4 and 21 in the operational amplifier 24 and amplified. Corresponding to the amplified voltage difference at any given time, there are obtained in the transformer 25, corresponding to the voltage difference, impulse differentiating results (frequencies), the number of which is constantly recorded at all times that the on-off valve 6 is open and the switch 13 is correspondingly closed. Upon a predetermined count being reached, for example, 1,000 impulses, the state of the counting meter 26 is increased by one unit. In this manner there is at all times readable at the meter 26 how large the heat quantity is that has flowed through since the beginning of recording, a heat quantity that is proportional to the existing temperature difference of the thermometer sensors 4 and 21, since the heat-carrying quantity flowing through is held constant by means of the flow valve.

In FIG. 5 is illustrated a further possibility of an embodiment of a control portion or servo valve for an on-off valve 6. This control portion sits in an outer valve housing 100 with a cover 101. Into it is inserted a housing insert 103 with an intermediate cover 104 which has a central passage 106 and which serves as a limiting abutment 107 and has an unloading opening 105 for preventing adhesion of a membrane 109 to the cover 104. The metal membrane 109, which has a central induced flow bore 110, is likewise fastened at its sides. Following it is an insert cover 112 which has a conducting passage 113. The cover 112 is further provided with an unloading opening 114 as well as with a recess 115 which has a relative depth that corresponds to the lift height of the membrane 109. This snap valve with calibrated lift operates without leakage. Furthermore, it affords a clear temperature difference between connecting and disconnecting. This control portion is connected to the passage portion of the on-off valve, as FIG. 2 shows, with a piston 45, spring 47, valve body 50, outlet opening 62, etc. It is, of course, somewhat more complicated in construction and more sensitive to pressure surges in the assembly than the control portion of the on-off valve according to FIG. 2.

This control portion, a servo valve which has a very small structural height, operates as follows:

The on-off valve, with its control portion and its passage portion, is in its closed condition. If, now, the pressure $p_1$ initially builds up, then there is exerted upon the membrane 109 of the control portion, from the inlet side, a pressure $p_3 = p_1$. The seal 36 that lies on the membrane 109 resists this pressure.

When the lower limit temperature is reached at the thermostat 9, the actuating rod 35 moves with the seal 36 and also the membrane 109 moves up into engagement with the insert cover 112 in consequence of the force conditioned upon the pressure $p_1$. In consequence of further drawing up of the seal 36, the pressure in the control chamber 118 rises abruptly, and the membrane snaps into its open position under the influence of this pressure. The passage 110 is opened, $p_3$ quickly falls, and the passage portion opens promptly.

This control portion of the on-off valve is associated with a passage portion with an outlet opening 62 and a housing drain opening 64 analogous to the embodiment of FIG. 2. The water flowing out of the control chamber 118, which is very small in quantity, arrives at the upper side of the insert cover 112. As in the construction according to FIG. 2, it flows laterally away through the induced flow channel 61 where, as explained, it is sucked away and arrives at the duct 10, which conducts this leakage water to a flow rate control valve, for example, of the type according to FIG. 4. This snap or flip-flop valve has a very small movable mass and is therefore extremely sensitive. In other respects, as mentioned, its structure is small, which makes it possible for it to be easily incorporated into existing apparatus.

Figure 6:
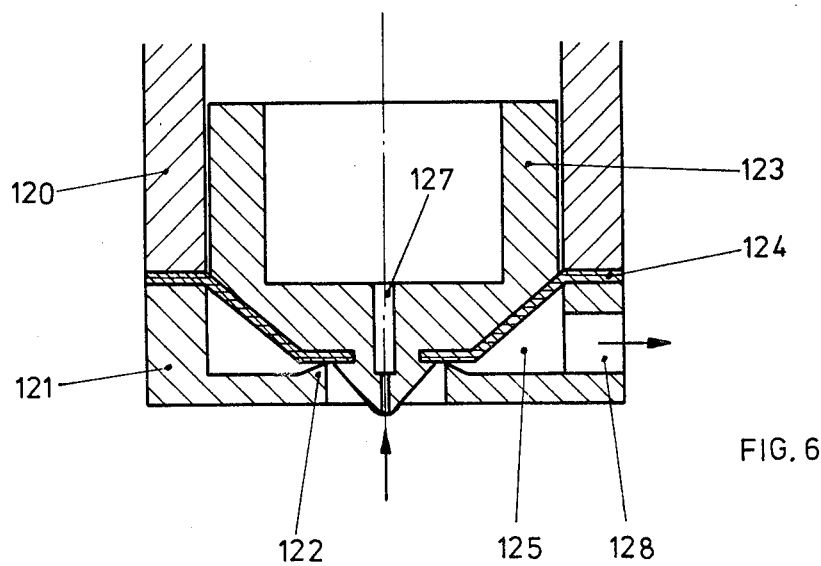
FIG. 6 is a section of a further variant according to FIG. 2.

In FIG. 6 is illustrated the lower portion of an on-off valve on the order of the on-off valve 6. This valve likewise comprises a housing insert 120 with an insert base 121 that has an annular valve seat 122. In the housing insert 120 there is provided a supporting piston 123 slidable with large radial play that carries a membrane 124 at its lower portion. This is fastened at its sides between the insert 120 and the insert base 121 and is fastened centrally in the supporting piston 123, as can be seen. The supporting piston is provided with an induced flow bore 127. There is further illustrated the outlet chamber 125 as well as an outlet opening 128, analogously to the embodiment according to FIG. 2. The functioning is identical with that of the embodiment according to FIG. 2. In contrast to this, however, the construction according to FIG. 6 comprises a piston with membrane seal, wherein there is the advantage that its mobility is not dependent upon the properties of the water, particularly its lime content. It is also to be noted concerning it that the calibrated bore 54 in FIG. 2 or 127 in FIG. 6 decisively damps the water hammer that occurs upon opening and closing of the valve.

It is therefore extraordinarily simple accurately to measure the radiated heat quantity with structural elements that are simple in construction and therefore inexpensive, with static means such as thermostatic sensors and resistance thermometers as well as corresponding electronic transformers and recorders. A through-flow heat recorder of this type is inexpensive in construction and positive in operation. It imposes few demands for upkeep, and replacement of defective parts is easy.

Figure 7:
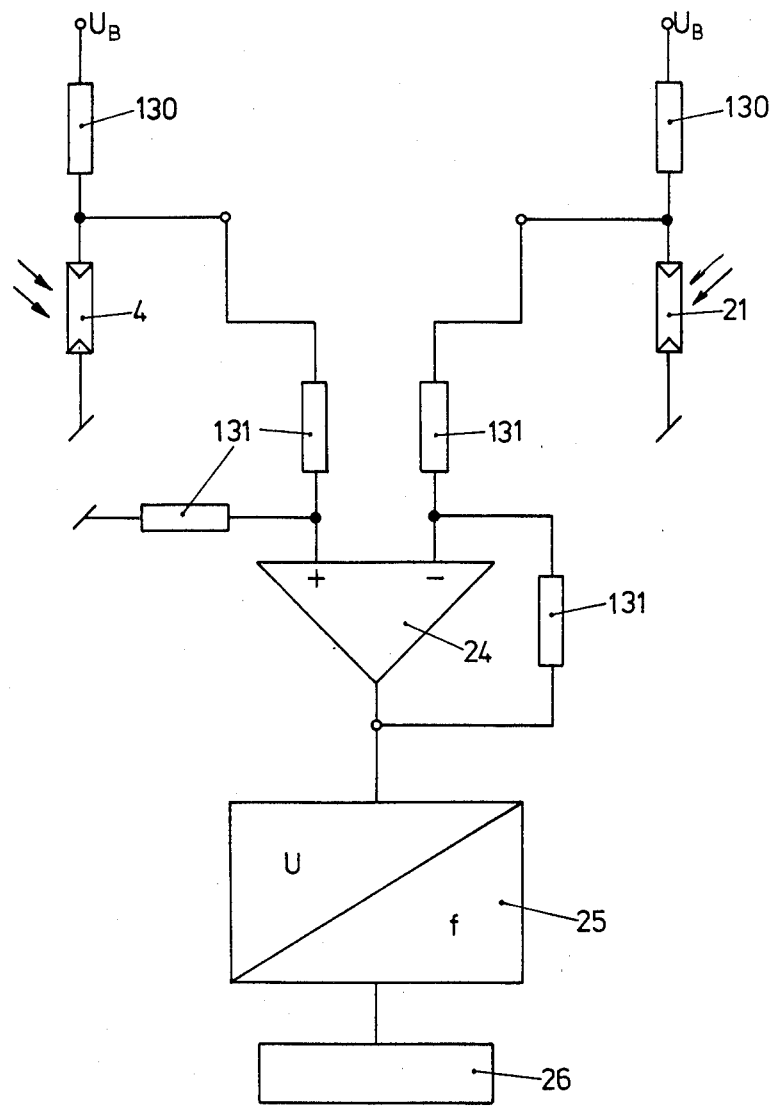
FIG. 7 is a circuit arrangement for the scheme according to FIG. 1.

In FIG. 7 is represented a possible circuit for the integration of the temperature differences and thereby for the determination of the total radiated heat quantity. Therein $U_B$ designates the supply voltage, while two conventional resistors are designated by 130. The resistance thermometer sensors 4 and 21 are connected in series with the resistors 130 and grounded, while the voltage picked off between them is conducted to the operational amplifier 24 through further conventional resistors 131, connected as disclosed in any textbook.

The frequencies manifested in this transformer are received by the counting meter 26. The particular counter condition gives the total heat quantity, wherein, depending upon the construction, the counter 26 is resettable to zero.

Figure 8:
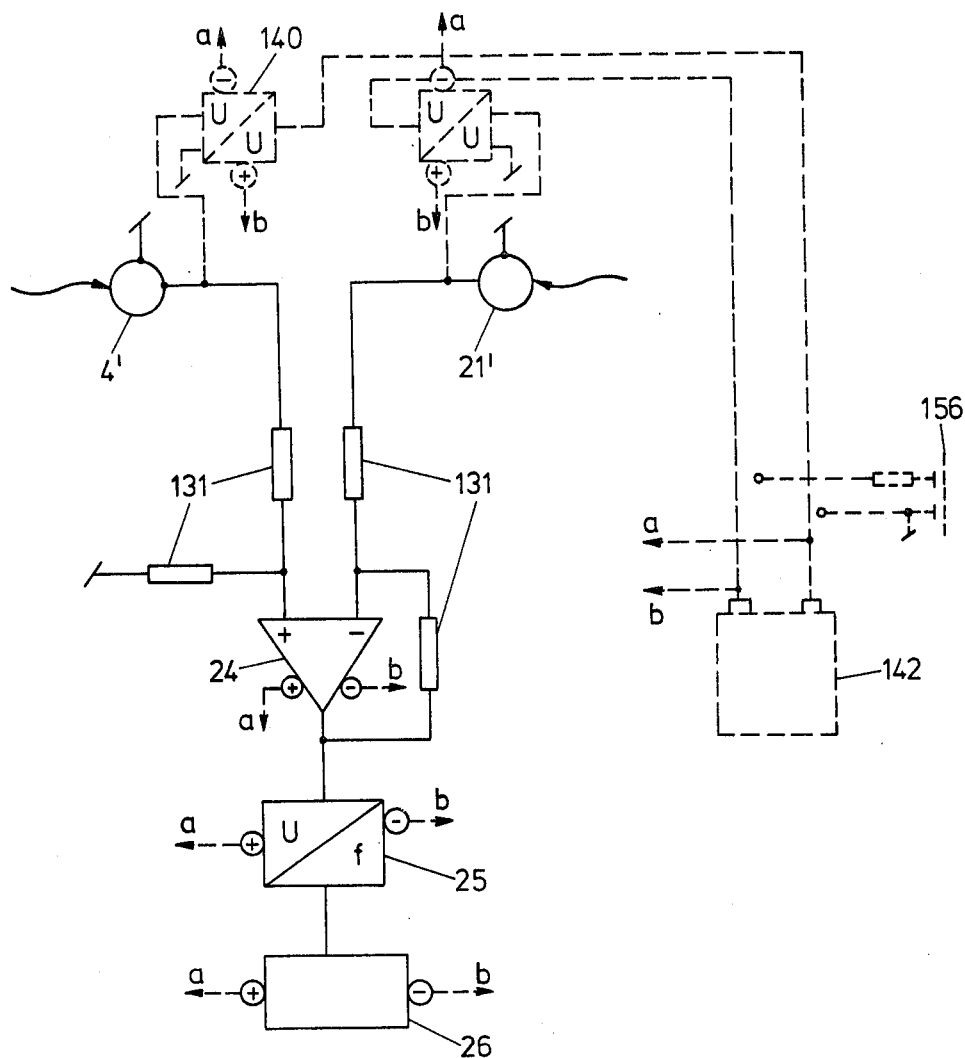
FIG. 8 is a further variant of the circuit arrangement according to FIG. 7.

If there are employed passive temperature variable resistors as illustrated in FIG. 7, active elements such as bimetal elements, or Peltier elements, then there is obtained a circuit such as is represented in FIG. 8. Here those portions that are employed in analogy to FIG. 7 have like designations. Whereas passive temperature/voltage transformers according to FIG. 7 need a supply voltage, active transformers such as Peltier elements or bimetal elements, such as are illustrated at 4' and 21' in FIG. 8, use no supply of their own. The fact that such active elements give off output without external electrical power thus opens the most highly advantageous possibility of having the after-connected electronics, that is, the amplifier 24, voltage-frequency transformer 25 and counter 26, self-energized by means of these active elements through a buffer battery. This commends itself, for example, with the employment of Peltier elements 4', 21'.

As is shown in broken lines in FIG. 8, the output voltage $U_{a4}$ of the transformer 4', as well as that of the transformer 21', is in each case conducted to a voltage multiplier 140, the output voltages of which, in corresponding polarity, stabilized by the buffer battery 142, supply the mentioned electronic components with symmetrical ±supply voltage or, as is signified in FIG. 1, with only one supply polarity. In FIG. 8 the supply connections a, b are connected with the correspondingly designated battery terminals.

Figure 9:
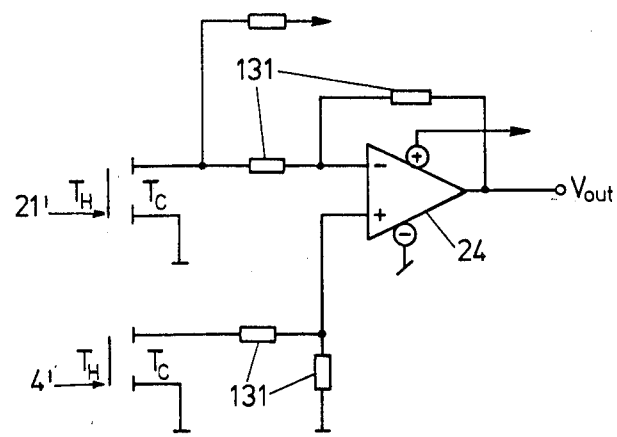
FIG. 9 is an embodiment of the variant according to FIG. 8 with two Peltier elements.

In FIG. 9 is illustrated the specific hook-up of two Peltier elements 21' and 4' as well as of an amplifier 24 according to FIG. 8. In this, by way of example, the Peltier element 21' according to FIG. 1 is arranged on the inlet side and the element 4' on the outlet side of the duct 10. The Peltier element 21' arranged on the inlet side is preferably employed without use of voltage multipliers 140 according to FIG. 8 for charging the battery, which latter is protected from discharging, in known manner and means, by means of a diode element (not shown) in case the Peltier output voltage is lower than the battery voltage. This arrangement delivers the monopolar self-supply of the electronics.

Figure 10:
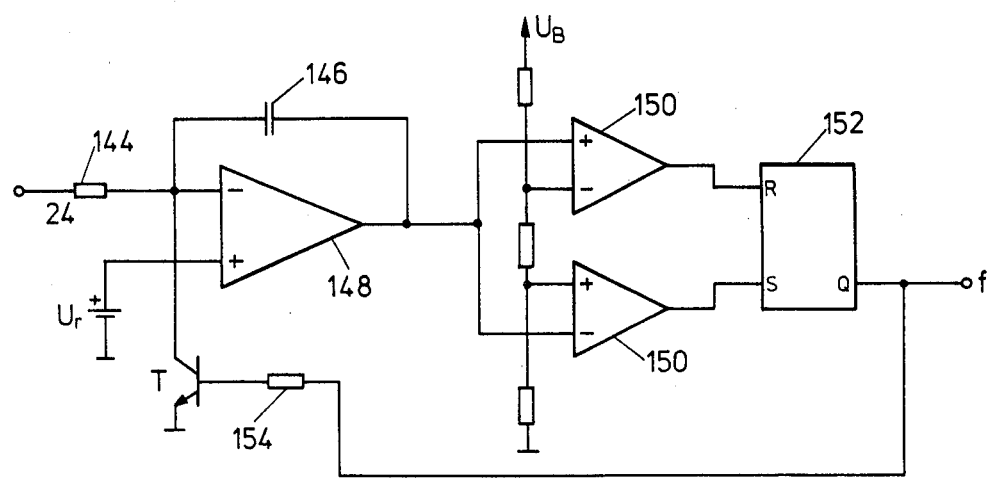
FIG. 10 is a discrete built-up frequency/voltage transformer as illustrated in FIGS. 1, 7, 8.

Preferably a discrete built-up circuit according to FIG. 10 is employed for the voltage-frequency transformer 25. The output signal of the amplifier 24 is conducted through a resistance element 144 to an operational amplifier 148 connected as an integrator with a feedback coupling capacitor 146, to which, additionally there is connected a reference voltage $U_r$. The output of the amplifier 148 is conducted to a pair of comparators 150 to each of which a reference voltage is conducted through a voltage divider having one side grounded, the other side connected to the supply voltage $U_B$. The outputs of the comparators 150, in correspondence with setting and resetting inputs, are conducted to a flip-flop 152, at the Q-output of which the input-voltage-controlled pulse frequency f appears. The output Q of the flip-flop 152 is conducted through a resistance element 154 to the base of a transistor T that has its emitter grounded and its collector connected with the control voltage input of the amplifier 148. In order to prevent unsymmetrical loading of the Peltier elements 21' and 4' of FIG. 9, conditioned upon the battery load, there can also be connected to the differential amplifier 24 only two bimetallic elements according to FIG. 8, for the determination of the through-flow temperature difference, and a single Peltier element is preferably arranged at the high temperature inlet side of the duct 10 according to FIG. 1 merely in order to assure the self-energization of the employed electronics via the battery. In this case separate temperature sensors and transformers are provided for the temperature supply voltage transformation. In FIG. 8 this variation with the Peltier element 156 is further represented in broken lines.

The components designated in the following table have been employed for the construction of the electronic portion:

| Part | Reference Character | Manufacturer |
|---|---|---|
| NTC | 4, 21 | Philips |
| PTC | 4, 21 | Philips |
| Peltier | 4, 21 4', 21', 156 | Combion 80 1.3960-01 |
| Operational Amplifier | 24, 148 150 | ICL 761x |
| Counter | 26 | TI (Texas Instr.) SN 74161 or C-Mos |

I claim:

1. In a system wherein a fluid medium is conducted from a pressurized source thereof through each of a plurality of zones of use, to satisfy demands at said zones for a characteristic of said medium that has a measurable and variable magnitude, and wherein each of said zones has an independently varying demand for said characteristic, measuring means for determining the total amount of said characteristic supplied to each said zone during a predetermined time interval, said measuring means comprising, for each said zone:

A. control means at the zone for producing a demand output at times when flow of said medium through the zone is required;

B. an on-off valve connected between said source and the zone and operatively connected with said control means, for permitting said medium to flow through the zone only when said demand output is being produced;

C. an automatic flow control device connected in series with said on-off valve for maintaining a predetermined substantially constant rate of flow of said medium through the zone whenever such flow is permitted;

D. sensing means for producing a continuous difference output which is at every instant proportional to the existing difference in said magnitude as between said medium flowing into the zone and said medium flowing out of the zone;

E. integrating means connected with said sensing means for producing a unit output each time the integral of said difference output with respect to time attains a predetermined value;

F. recording means connected with said integrating means for recording the number of said unit outputs issued during said predetermined time interval; and G. switch means controlled by said control means and connected between said sensing means and said recording means to prevent unit outputs from being fed to said recording means at times when no demand output is produced.

2. The system of claim 1 wherein said flow control device comprises:

(1) a valve body having
(a) an inlet, and
(b) outlet port means spaced from said inlet;
(2) a valve element slidable in said valve body in directions towards and from said inlet and defining a passage through which said inlet is communicated with said port means, said valve element
(a) being biased towards said inlet and
(b) having a surface upon which medium flowing from said inlet to said port means exerts a force that varies with flow velocity and whereby said valve element is urged away from the inlet; and
(3) flow control means on said valve element, cooperable with said port means to increasingly close the same with increasing displacement of the valve element away from said inlet, so that increasing velocity of flow of said medium results in increasing throttling of such flow.

3. The system of claim 1, wherein said on-off valve comprises:

(1) a hollow valve body that defines
(a) an inwardly facing valve seat surrounding an inlet,
(b) a discharge outlet spaced from said inlet, and
(c) an induced flow outlet spaced from said inlet and said discharge outlet;
(2) a piston in the valve body, substantially separating said inlet and said discharge outlet from said induced flow outlet, said piston
(a) being slidable in opposite directions to and from a valve closed position,
(b) being biased in the direction towards said valve closed position,
(c) having a surface upon which medium flowing through said inlet exerts a force in the opposite direction, and
(d) having a restricted passage therethrough which at all times provides for limited communication between said inlet and said induced flow outlet;
(3) a valve element carried by said piston and engaged with said valve seat in the valve closed position of the piston to block flow of medium from said inlet to said discharge outlet; and
(4) actuating valve means operatively associated with said control means and responsive to said demand output, whereby said induced flow outlet is opened only when said demand is being produced and is otherwise maintained closed to prevent flow of medium through said restricted passage and thus prevent movement of the piston out of its valve closed position.

4. The system of claim 3 wherein said valve body further defines a chamber which is at the side of said piston remote from said inlet and from which said induced flow outlet opens, further characterized by:

(5) injector means near said discharge outlet, having a suction connection with said chamber, whereby medium tends to be drawn out of said chamber by the flow of medium from said inlet to said outlet.

5. The system of claim 1, further characterized by: said on-off valve being a pilot-operated valve.

6. The system of claim 2 wherein said flow control device is further characterized by
(a) said valve body having
(1) a side wall that concentrically surrounds said valve element and
(2) an end wall adjacent to said outlet port means, and
(b) said outlet port means being defined by circumferentially spaced radially outwardly opening apertures in said side wall.

7. The system of claim 6 wherein said radially outwardly opening apertures in said side wall are in the form of circumferentially elongated slits.

* * * * *